US011956882B2

(12) United States Patent
Jevtic et al.

(10) Patent No.: US 11,956,882 B2
(45) Date of Patent: Apr. 9, 2024

(54) HIGH-POWER PLASMA TORCH WITH DIELECTRIC RESONATOR

(71) Applicant: Radom Corporation, West Allis, WI (US)

(72) Inventors: Jovan Jevtic, Menasha, WI (US); Ashok Menon, Shorewood, WI (US); Velibor Pikelja, Milwaukee, WI (US)

(73) Assignee: Radom Corporation, West Allis, WI (US)

( * ) Notice: Subject to any disclaimer, the term of this patent is extended or adjusted under 35 U.S.C. 154(b) by 228 days.

(21) Appl. No.: 17/652,839

(22) Filed: Feb. 28, 2022

(65) Prior Publication Data

US 2023/0276562 A1 Aug. 31, 2023

(51) Int. Cl.
*H05H 1/30* (2006.01)

(52) U.S. Cl.
CPC .................................... *H05H 1/30* (2013.01)

(58) Field of Classification Search
CPC .. H05H 1/00; H05H 1/26; H05H 1/28; H05H 1/30
See application file for complete search history.

(56) References Cited

U.S. PATENT DOCUMENTS

| | | | | |
|---|---|---|---|---|
| 9,491,841 | B2 | 11/2016 | Jevtic et al. | |
| 9,706,635 | B2 | 7/2017 | Jevtic et al. | |
| 10,285,256 | B2 | 5/2019 | Jevtic et al. | |
| 10,337,998 | B2 | 7/2019 | Jevtic et al. | |
| 10,863,611 | B2 | 12/2020 | Jevtic et al. | |
| 10,900,907 | B2 | 1/2021 | Menon et al. | |
| 2018/0332697 | A1* | 11/2018 | Bazargan | H05H 1/28 |
| 2019/0186373 | A1 | 6/2019 | Lowery et al. | |
| 2019/0215943 | A1 | 7/2019 | Jevtic et al. | |
| 2021/0391156 | A1 | 12/2021 | Chan et al. | |

FOREIGN PATENT DOCUMENTS

| | | | |
|---|---|---|---|
| CN | 104637775 | B | 3/2018 |
| EP | 2973639 | B1 | 5/2018 |

OTHER PUBLICATIONS

PCT/US2023/013107 International Search Report, dated Jun. 5, 2023.

* cited by examiner

*Primary Examiner* — Jimmy T Vu
(74) *Attorney, Agent, or Firm* — Boyle Fredrickson S.C.

(57) ABSTRACT

A plasma torch employs a dielectric resonator excited at separate locations with phase shifted signals to provide more uniform current flow through the resonator. High-power operation is possible while protecting the dielectric by using a combination segregated spiral flow and linear flow cooling air at different rates. Microwave leakage from the plasma resonant chamber is contained by conductive metal chokes.

30 Claims, 4 Drawing Sheets

HIGH-POWER PLASMA TORCH WITH DIELECTRIC RESONATOR

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to high-temperature plasma torches and in particular to a high-power plasma torch using a dielectric resonator.

Plasma torches, which produce a jet of high-temperature plasma, are used for cutting, plasma spraying, waste disposal, and the like. In a common design, a gas passes through an arc between electrodes and the energy of the arc converts the gas to a plasma exiting from the torch as a jet. The electrodes of such systems are subject to erosion, especially at high power, and corrosion by the carrier gas.

U.S. Pat. No. 9,706,635 entitled: "Plasma generator using dielectric resonator" describes a method of plasma generation using intense electrical fields produced by a circumferentially excited dielectric resonator. Such an approach eliminates arc electrodes and the associated problems of electrode wear and contamination of the plasma from such electrodes.

SUMMARY OF THE INVENTION

The present invention increases the power that can be output by a dielectric resonator plasma torch by multipoint excitation of the dielectric element, for example, using a branched waveguide. By exciting the dielectric at multiple points, asymmetrical current flow and heating of the dielectric material is reduced increasing power handling by the dielectric within desired temperature limits and improving the uniformity of plasma density and temperature. In addition or separately, a combination of spiral and linear airflow thermally isolates the intense plasma from the dielectric material allowing desirably higher intensity electrical fields possible with smaller dielectric channel sizes. Axially opposed choke tubes integrate into this torch assembly to both provide support for a torch tube guiding the plasma and the desired spiral and linear airflows, while greatly reducing emitted microwave radiation for improved efficiency and safety.

In one embodiment, the invention provides a plasma torch including at least one radiofrequency energy source, a dielectric ring providing a central opening extending along an axis, and a gas port for introducing plasma feeder gas along the axis through the central opening. A waveguide conducts radiofrequency energy from the at least one radiofrequency energy source to circumferentially separated points along the dielectric ring, the phase shift of radiofrequency energy at the circumferentially separated points matching a phase shift of current flow through the dielectric ring during resonant circumferential current flow through the dielectric ring.

It is thus a feature of at least one embodiment of the invention to increase the current handling capability of the dielectric ring and to improve the uniformity of plasma density and temperature by identifying and correcting points of excess energy dissipation.

The waveguide may provide a three-port, E-type junction having a first channel communicating with a waveguide entrance and splitting to a second and third channel communicating with a first and second waveguide exit at the circumferentially separated points to provide at the first and second waveguide exits a relative phase shift of 180° in the exiting radiofrequency energy, and wherein the circumferentially separated points are diametrically opposed about the dielectric ring with respect to the axis.

It is thus a feature of at least one embodiment of the invention to employ a simple waveguide structure to generate proper phasing and separation of the excitation points.

The second and third channels may curve inwardly about the axis.

It is thus a feature of at least one embodiment of the invention to modify a standard waveguide shape to minimize waveguide length and dissipation.

The first channel may include a set of stepped constrictions providing an impedance matching between the radiofrequency energy source and the dielectric ring.

It is thus a feature of at least one embodiment of the invention to allow the waveguide structure to also perform impedance matching.

The waveguide may support a transverse electromagnetic radio field having perpendicular E and H directions, and the waveguide maybe releasably separable across the H direction.

It is thus a feature of at least one embodiment of the invention to provide a waveguide structure that can be readily manufactured without inaccessible internal voids while also minimizing the disruption in the waveguide structure caused by such separability by separating across the low current H direction.

The plasma torch may further include a tuned cavity defining a substantially cylindrical volume holding the dielectric ring and providing opposed openings at opposed bases of the cylindrical volume along the axis and aligned with the central opening and providing the circumferentially separated points around the circumference of the cylindrical volume.

It is thus a feature of at least one embodiment of the invention to promote coupling between the waveguide and the dielectric ring through a containing tuned cavity.

The tune cavity may include a set of washer-shaped conductive shims releasably insertable into the tuned cavity to tune the tuned cavity to a resonant frequency of the dielectric ring.

It is thus a feature of at least one embodiment of the invention to provide a simple mechanism for accurately tuning the cavity to the dielectric resonator.

The dielectric ring may include multiple dielectric ring elements aligned and spaced along the axis.

It is thus a feature of at least one embodiment of the invention to allowing arbitrary scaling of power through the use of axially-stacked dielectric rings.

In one embodiment, the plasma torch may include a first conduit passing along the axis through the central opening in receiving the plasma feeder gas. A second gas port may be provided introducing inner cooling gas into the first conduit at an angle to the axis to promote a spiral flow of inner cooling gas around the plasma feeder gas along the axis, and a third gas port may be provided for introducing outer cooling gas into a second conduit coaxially around the first conduit for flow along the axis in a sheath around the first conduit.

It is thus a feature of at least one embodiment of the invention to provide two tailored air-cooling mechanisms to protect the dielectric ring. A first spiral gas within the first conduit envelops and separates the plasma of the plasma feeder gas from the conduit wall. This spiral gas may be coordinated with the speed of the plasma feeder gas. Outside of the conduit, a much higher speed linear flow may be adopted to scavenge heat leaking through the first conduit and to remove the heat from the inner surface of the dielectric ring by forced convection. The first conduit allows separate control of these two different streams.

The plasma torch may further include a manifold providing a circumferential passageway around the first conduit having a circumferential cross-sectional area at least twice an axial cross-sectional area between the first and second conduits.

It is thus a feature of at least one embodiment of the invention to provide uniform cooling airflow on all sides of the first conduit through a smoothing manifold structure.

The outer cooling gas may exit the second conduit before an end of the first conduit through openings directing the outer cooling gas radially with respect to the axis.

It is thus a feature of at least one embodiment of the invention to permit independent control of the plasma-involved gases and the outer cooling gas.

In one embodiment, the openings may direct the outer cooling gas away from the axis.

It is thus a feature of at least one embodiment of the invention to eliminate interference between the high-velocity cooling gas and the plasma plume stability.

The first conduit may extend outside of the tuned cavity and be supported at first and second ends at points beyond the tuned cavity by conductive metal sleeves surrounding the outer cooling flow, the metal sleeves centering the first conduit within the central opening and opposed openings and extending axially from the bases by at least 1 cm.

It is thus a feature of at least one embodiment of the invention to provide a microwave choke structure serving multiple purposes including reducing emitted microwave energy, supporting the first conduit, and providing the walls of the second conduit.

The dielectric ring may comprise multiple dielectric ring elements aligned and spaced along the axis by an insulating support providing a smooth central lumen forming an inner wall of the second conduit.

It is thus a feature of at least one embodiment of the invention to allow the outer cooling flow to flow closely adjacent to the dielectric structure for improved cooling with closer proximity of the dielectric current flow to the generated plasma.

These particular objects and advantages may apply to only some embodiments falling within the claims and thus do not define the scope of the invention.

DETAILED DESCRIPTION OF THE PREFERRED EMBODIMENT

Figure 1:
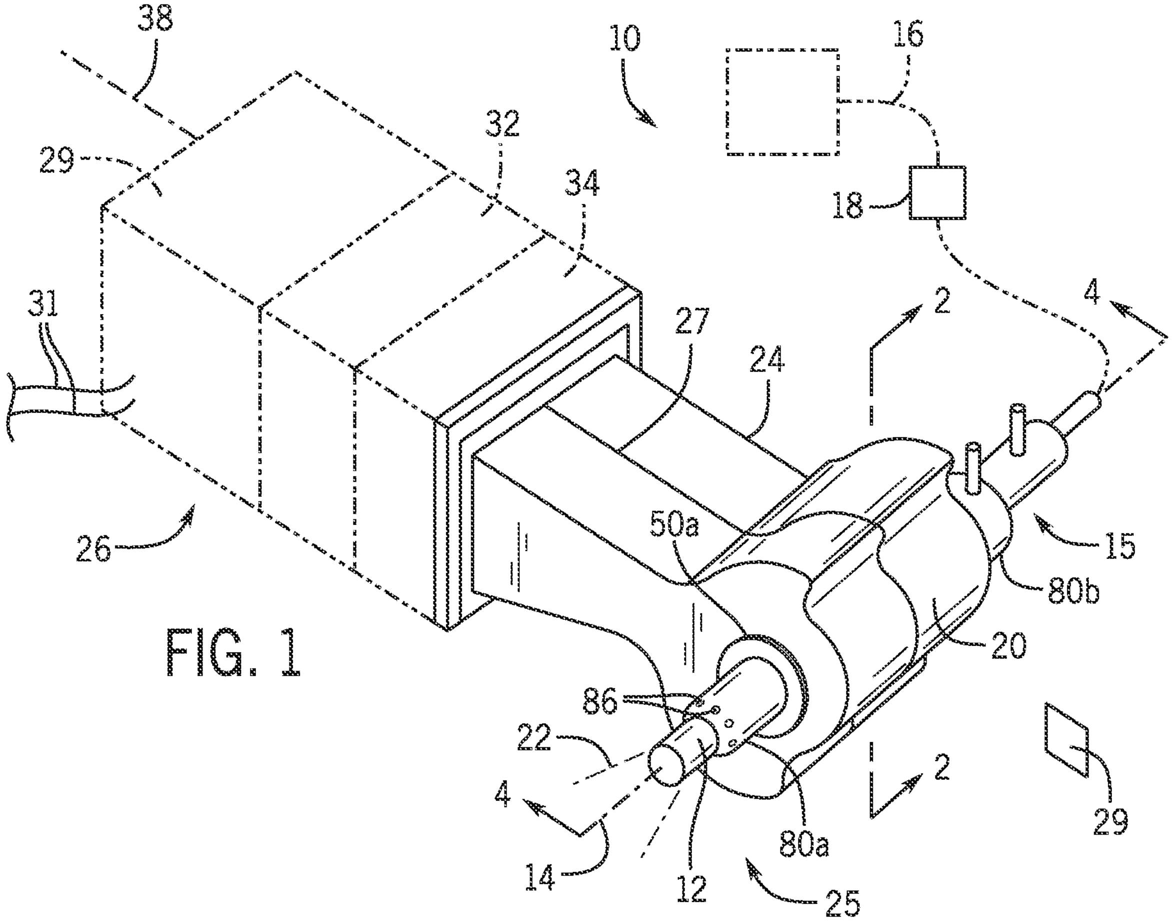
FIG. 1 is a perspective view of a plasma torch constructed according to the present invention showing, in phantom, components of a microwave generator system providing radiofrequency energy to a bifurcated waveguide holding a torch assembly receiving feed gas to provide a plasma torch output.

Referring now to FIG. 1, a plasma torch 10 may provide a torch tube 12 having a central lumen and extending along a torch axis 14. In some embodiments, the torch tube 12 may be a high temperature glass material such as a fused quartz glass or low thermal expansion borosilicate glass or ceramic material such as alumina or boron nitride to withstand high temperatures of plasma that will be generated within the torch tube 12.

The torch tube 12 communicates at an inlet side 15 with a source of plasma feeder gas 16, for example, initially providing argon or the like and then transitioning to nitrogen or air. Before being received by the torch tube 12, the feeder gas 16 may pass through a spark unit 18 providing a high-voltage electrode imparting an initial ionization of the feeder gas 16 received by the torch tube 12.

The torch tube 12 extends from the inlet side 15 along the axis 14 through a waveguide cavity 20 operating to expose the feeder gas 16 in the torch tube 12 to an intense alternating electrical field stripping the electrons from the gas to create the plasma state. The resulting plasma 22 may exit the torch tube 12 at an exit side 25 as a driven flow of the feeder gas 16.

The waveguide cavity 20 communicates through an input arm 24 extending perpendicularly from the axis 14 with a microwave system 26. This microwave system 26 generally provides a source of high frequency microwave energy, for example, in excess of 2.5 GHz, and may provide a power in excess of 1 kW. The microwave system 26, for example, may provide a microwave generator, such as a magnetron with an isolator, 28 receiving a source of electrical power 31 to generate microwave energy which is then passed through a bidirectional power meter 32 and then through a stub tuner 34 of conventional design. The bidirectional power meter 32 measuring input energy from the magnetron 28 and reflected energy from the waveguide cavity 20 allows assessment of impedance matching between the magnetron 28 and the waveguide cavity 20. This impedance may be adjusted using the stub tuner 34 to maximize transfer of power from the magnetron 28 to the waveguide cavity 20.

Figure 2:
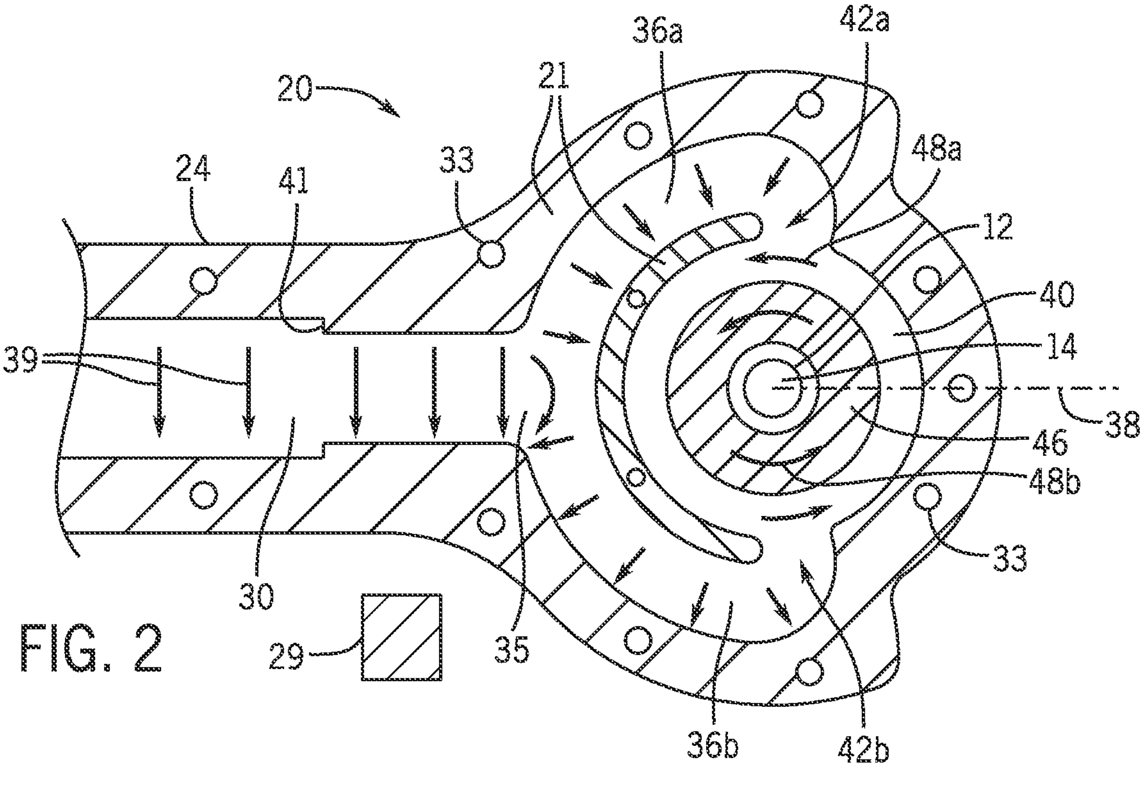
FIG. 2 is a fragmentary cross-sectional view of the bifurcated waveguide along line 2-2 of FIG. 1 showing an impedance matching input waveguide arm dividing at a T junction into bifurcated left and right arms conducting electromagnetic energy with 180° relative phase shift for exciting diametrically opposite sides of a dielectric resonator.

Referring now also to FIG. 2, the waveguide cavity 20 provides multiple, inter-communicating internal waveguides channels 30, 36*a* and 36*b*, as will be described in more detail below. To provide the waveguide function, the waveguide cavity 20 is desirably constructed of a conductive material such as aluminum or the like providing the necessary electrical boundary conditions of a waveguide. Fabrication of the channels 30, 36*a*, and 36*b* is facilitated by constructing the waveguide cavity 20 in two halves having mirror symmetry joined at a seam 27 defining a connection plane 29 between the halves. By separating the waveguide cavity 20 along this connection plane 29 (oriented vertically in FIG. 1 and generally perpendicular to the axis 14), the channels 30, 36*a*, and 36*b* are readily fabricated, for example, by machining a solid metal element with a mill cutter or the like.

The connection plane is selected, 29 as depicted, to be generally parallel to the electrical field of a transverse electromagnetic wave passing through the channels 30, 36*a* and 36*b*, and thereby reduces the need for current flow between the halves of the waveguide cavity during operation as a waveguide, and thus minimizing the need for good electrical communication between the halves.

The two halves of the waveguide cavity 20, after machining, may be assembled together by means of machine screws (not shown) engaging threaded bolt holes 33 cut and tapped in the outer and inner walls 21 of one half of the waveguide cavity 20 (aligned with corresponding bores in the other half) defining the channels 30, 36*a* and 36*b*.

The inner and outer walls 21 define the first channel 30 to extend along a longitudinal axis 38 perpendicular to the axis 14 within the input arm 24 between the microwave system 26 and the torch tube 12. This channel 30 provides a transverse electric mode of transmission of microwave energy with an orientation of the electric field 39 aligned with the plane 29 (the arrow showing the reference direction for the electric field intensity vector) as discussed above facilitating construction of the waveguide cavity 20.

The inner surface of the channel 30 may include a series of stepped reductions 41 as one moves from the microwave system 26 toward the torch tube 12 providing impedance matching of a type generally understood in the art.

The channel 30 terminates before reaching the torch tube 12 at a T-junction 35 where it splits into a left (upper as depicted) and right (lower as depicted) channel 36*a* and 36*b* providing a so-called "E-type waveguide" junction in which the conducted radiofrequency energy separates to pass equally down the left and right channels 36*a* and 36*b* but with a relative 180° phase shift between the electrical polarization of the radiofrequency energy passing through channels 36*a* and 36*b*.

The left and right channels 36*a* and 36*b* initially diverge perpendicularly from the channel 30 at the T-junction 35 but then follow a curve of constant radius about the axis 14 symmetrical about the longitudinal axis 38 to termination points adjacent to opposite sides of a periphery of a tuned cavity 40. Generally, the width of each of the channels 36 in the depicted E-plane of FIG. 2 will be half the width of the channel 30 at the T-junction 35. The tuned cavity 40 provides a generally cylindrical shape whose axis of symmetry is parallel to and centered on the axis 14, and the termination points of the left and right channels 36*a* and 36*b* are centered on opposite sides of that cylinder along a diameter of the cylinder.

Mutually opposed and facing openings 42*a* and 42*b* are provided between cavity 40 and respective left channel 36*a* and right channels 36*b*. The width of each of the openings 42 in the depicted E-plane of FIG. 2 and the height of each of the openings 42 orthogonal to the depicted E-plane of FIG. 2 determine the amount of electromagnetic coupling between channels 36 and cavity 40 and can be determined by using electromagnetic field simulation or by experiment to minimize the reflection of microwave energy.

The openings 42*a* and 42*b* allow the energy from the left channel 36*a* and right channel 36*b*, as previously phase shifted, to enter the cavity 40 on opposite sides with opposite electromagnetic phase.

Centered within the cavity 40 about the axis 14 and torch tube 12 is a dielectric resonator 46 being, in one embodiment, an annular ring symmetric about the axis 14. As so positioned, the opposite of electrical field polarities of electrical energy from each of the openings 42*a* and 42*b* induce opposite currents 48*a* and 48*b* on opposite sides of the dielectric resonator 46 to promote cyclic current flow therethrough at the frequency of the radiofrequency energy. The dimensions of the dielectric resonator 46 and of the cavity 40 holding the dielectric resonator 46 are adjusted to encourage an oscillating current flow within the dielectric resonator 46 at the frequency of the microwave power. By separate and opposite excitation of the dielectric resonator 46 through openings 42*a* and 42*b* more uniform current flow through the dielectric resonator 46 is possible, reducing peak heating of the dielectric resonator 46 and providing a more uniform induced electrical field within the plasma 22 and thus a more uniform and stable plasma 22. The process of generating plasma through a concentrated yet highly uniform electrical field within a dielectric resonator is described in more detail in U.S. Pat. Nos. 9,706,635 and 9,491,841, assigned to the assignee of the present application and cited above and hereby incorporated by reference.

The material of the dielectric resonator 46 desirably has any one or more of the qualities of: a quality factor of greater than 100, an electrical resistivity greater than $1\times10^{10}$ Ωcm, a dielectric constant with a loss tangent of less than 0.01, and a dielectric constant (relative permittivity) greater than five.

Figure 3:
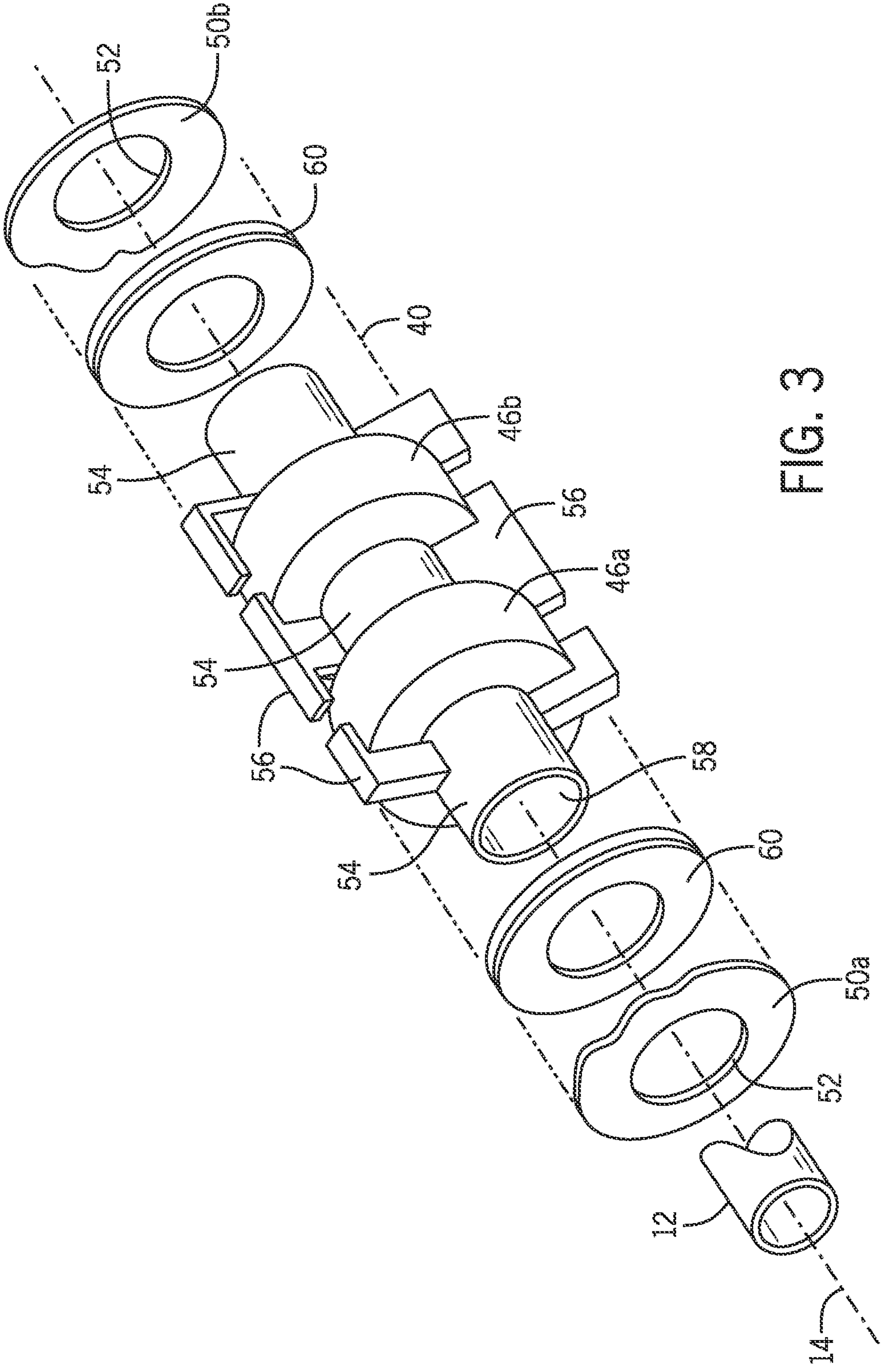
FIG. 3 is an exploded perspective view of the dielectric resonator held within a cavity formed by the waveguide of FIG. 2 showing insulating supports aligning and spacing separate dielectric rings along an axis and a shim system for tuning the containing cavity.

Referring now to FIG. 3, the cavity 40 may generally provide for end plate 50*a* at an inlet side 15 of the torch tube 12 and end plate 50*b* at the exit side 25 of the torch tube 12, each providing conductive bases of the cylindrical cavity 40. Holes 52 in these end plates 50 centered on axis 14 allow passage of the torch tube 12 therethrough with ample clearance between the edges of the holes 52 in the end plates 50 and the torch tube 12 for airflow therebetween as will be discussed.

The holes 52 may have internal opposed counterbores which receive an insulating end of an axially extending insulating tube 54, for example, constructed of a fluorinated hydrocarbon such as Teflon®. Desirably the insulating tube 54 provides high electrical insulation with a low relative permittivity of less than four and has a diameter sized to fit tightly within the counterbores to be held fixedly therein centered on axis 14.

Central openings in one or more annular dielectric resonators 46*a* and 46*b* have the same diameter as the inner diameter of tubes 54 to be aligned thereby with axis 14 and held in spaced separation by hooks 56 extending radially from the outer surface of the tube 54, for example, at a spacing of 120°, capturing the sides of the dielectric resonators 46. The tube 54 and hooks 56 may be assembled from multiple components but desirably from a substantially smooth and continuous inner bore 58 to facilitate the flow of air therethrough (for example, between the inner bore 58 and an outer surface of the torch tube 12) with minimized turbulence.

Referring still to FIG. 3, a set of electrically conductive shim washers 60 may be assembled together in different combinations (to change a total conductive thickness along axis 14) and fit over the ends of the tube 54 on opposite sides of the dielectric resonators 46 to press against the inner surface of the end plates 50*a* and 50*b*. By changing the number of conductive shim washers 60, adjustment of the size of the cavity 40 may be made to tune the cavity 40 to the desired resonant frequency of the microwave energy and the dielectric resonator is 46. In this respect, the conductive shim washers 60 essentially change the height of the cylindrical cavity through electrical connection with the conductive metal of the cavity 40.

It will be appreciated that an arbitrary number of dielectric resonators 46 may be arrayed along the tube 54 with corresponding increases in the height of the cavity 40, for example, when higher power plasma torches are required.

Figure 4:
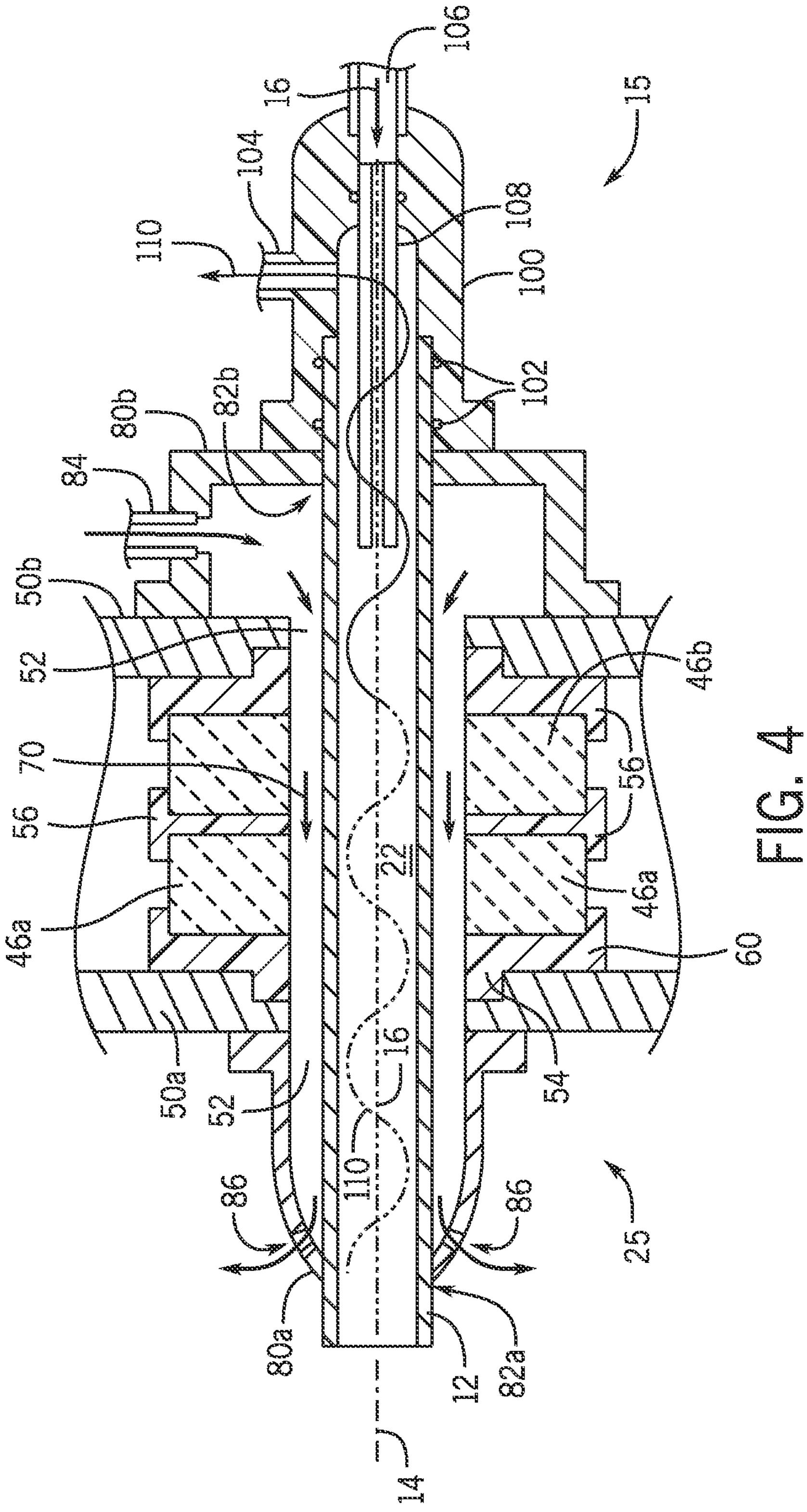
FIG. 4 is a cross-sectional view taken along line 4-4 of FIG. 1 showing the assembled microwave torch (axially compressed for improved clarity) with multiple gas flow paths and conduits.

Referring now to FIG. 4, as noted, the torch tube 12 may extend through the end plates 50 of the cavity 40 through holes 52 having a larger diameter than the diameter of the torch tube 12 allowing high thermal transfer cooling air 70 to pass parallel to the axis 14 between the outer surface of the torch tube 12 and the inner surfaces of the tubes 54 and the dielectric rings 46. For this purpose, the diameter of the holes 52 may closely match the diameter of the tube 54. The airflow outside of the torch tube 12 serves to protect the dielectric resonator 46 and the material of the tube 54 from extreme high temperature of plasma 22 within the torch tube 12. Generally, the separation between the outer surface of the torch tube 12 and the inner surface of the tube 54 using high flow rates of air may be less than 2 mm and preferably less than 1 mm so as to provide a desired close proximity between the dielectric resonators 46 and the axis 14 to concentrate the electrical field within the torch tube 12 for plasma generation.

Referring to FIGS. 1 and 4, the torch tube 12 is centered within the larger openings of the holes 52 by conductive metal sleeve 80*a* at the exit side 25 and metal sleeve 80*b* at the inlet side 14, each of which are attached to the outer surfaces of respective end plates 50*a* and 50*b*. The metal sleeves 80*a* and 80*b* extend away from the respective end plates 50*a* and 50*b* to provide at their distal ends support openings 82*a* and 82*b* closely conforming to the outer diameter of the torch tube 12. In this way, the support openings 82*a* and 82*b* both support and align the torch tube 12 along the axis 14 and center the torch tube 12 within the holes 52 and the inner surface of the tube 54.

One of the conductive metal sleeves 80*b* provides a manifold portion for receiving cooling air 70 through a first inlet 84. This manifold portion is sized to produce a low resistance to airflow circumferentially around the torch tube 12 within the manifold portion so that air may be uniformly received on all sides of the tube 12 for uniform axial flow. In this regard, the cross-sectional area of the manifold portion of the sleeve 80*b* defining a passage of airflow around the tube 12 (and thus measured in a plane perpendicular to that airflow) will be at least twice and desirably more than five times the cross-sectional area between the outer surface of the tube 12 and the inner surface of the tube 54 perpendicular to the axis 14.

The remaining conductive metal sleeve 80*a*, in contrast, and as previously discussed, will provide a smooth continuation of the inner surface of the tube 54 which together with the inner surface of the hole 52 promotes low turbulence flow of air 70 axially toward the exit side 25. Radially directed openings 86 at the distal end of the metal sleeve 80*a* are distributed circumferentially around the distal end of the metal sleeve 80*a* to discharge the high transfer cooling air 70 radially away from the axis 14 to reduce interference with the plasma 22 exiting the torch tube 12.

Referring still to FIG. 4, the torch tube 12 may extend rearwardly through opening 82*b* of the metal sleeve 80*b* and out of the metal sleeve 80*b* to be received within a corresponding bore of an electrically insulating secondary manifold assembly 100 extending generally rearwardly along axis 14. The secondary manifold assembly 100 may seal to the end of the torch tube 12, for example, by means of one or more O-rings 102 which also serve to align the secondary manifold assembly 100 with the torch tube 12 and axis 14.

The secondary manifold assembly 100 provides a volume communicating with a second gas cooling inlet 104 receiving a cooling gas 110, such as air, steam, methane, carbon-dioxide, hydrogen, argon, helium, or any combination thereof, generally at a tangent to the axis 14 and further communicating with a plasma feeder gas inlet 106 generally aligned with the axis 14 receiving plasma feeder gas 16 (shown in FIG. 1). This feeder gas 16 is conducted by an introducer tube 108 also aligned with axis 14 extending within the torch tube 12 into the manifold assembly 100 and coaxially within the torch tube 12 terminating at a point prior to passing into the waveguide cavity 20. The feeder gas 16 from plasma feeder gas inlet 106 will generally pass smoothly along a linear path along axis 14 whereas the cooling gas 110 from the second gas cooling inlet 104 will be received tangentially to spiral about the feeder gas 16 serving to corral the heated plasma 22 in the feeder gas 16 away from the walls of the torch tube 12. Thus the cooling gas 110 serves to reduce contact between the plasma and the walls of the torch tube 12. The introducer tube 108 may be, like torch tube 12, a glass material such as a quartz or borosilicate glass or the like or a ceramic material such as alumina or boron nitride or the like.

By providing segregated spiral cooling gas 110 through second gas cooling inlet 104 and cooling gas 70 through inlet 84, the benefits of a spiral flow shielding the inner surface of the torch tube 12 together with a higher velocity a direct linear flow of cooling gas 70 can be provided without the need for similar gas flow velocities such as can be non-optimal for these different flow purposes and patterns. Thus, for example, the high transfer cooling air 70 may be pumped at about 200 L per minute to maintain a peak temperature of less than 90° C. in contrast to the cooling gas 110 and plasma feeder gas 16 passing at 100 L per minute but reaching temperatures of over 3000° C.

Figure 5:
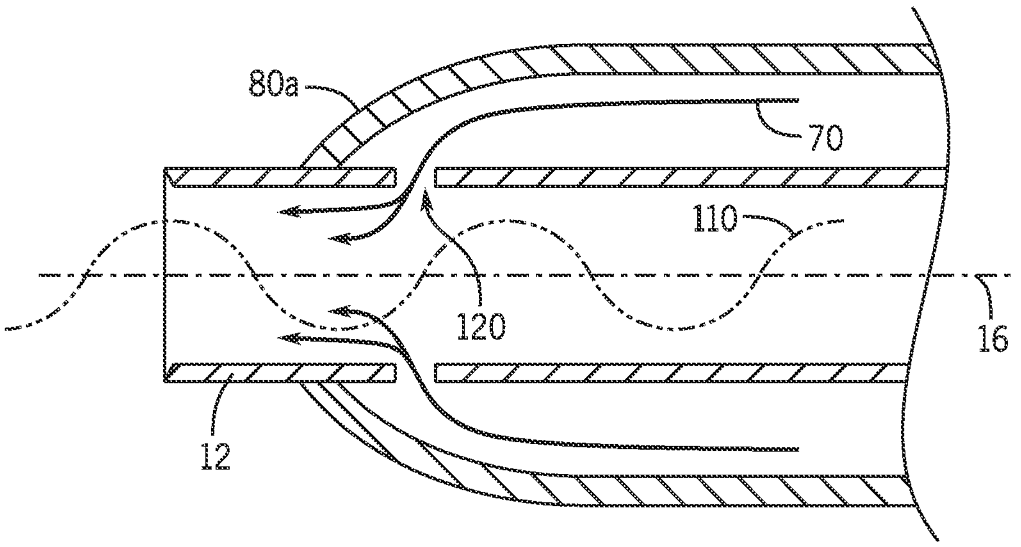
FIG. 5 is a fragmentary view of an alternative arrangement of an exit portion of the plasma torch of FIG. 4 for use when plasma quenching is desired.

Referring now to FIG. 5, in some cases, it may be desired to rapidly quench the plasma exiting the torch tube 12 and for this purpose the torch tube 12 at a point within the metal sleeve 80*a* may include a set of circumferentially spaced openings 120 allowing high transfer cooling air 70 to be introduced into the plasma feeder gas 16 and cooling gas 110, before those latter gases pass out of the torch tube 112. This arrangement may provide rapid quenching of the plasma 22, for example, to moderate chemical reactions in the plasma 22. For example, this cooling may be useful when decomposing carbon dioxide into carbon and oxygen to prevent recombination of these elements or when producing nitric oxide in air plasma to prevent its dissociation. Similarly, such a cooling may also be desired when a plasma spraying operation is being conducted, for example, with material introduced into the plasma to then be sprayed to a surface or the like.

Referring again to FIG. 4, each of the metal sleeves 80*a* and 80*b* may extend by at least 1 cm and desirably by a length equal to at least 4 times the inverse of the attenuation constant inside the waveguide below cutoff formed by the inner surface of the sleeve so as to provide an electrical choke minimizing the emission of microwave energy from the waveguide cavity 20.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A plasma torch comprising:

at least one radiofrequency energy source;

a dielectric ring providing a central opening extending along an axis;

a gas port for introducing plasma feeder gas along the axis through the central opening; and a waveguide conducting radiofrequency energy from the at least one radiofrequency energy source to circumferentially separated points along dielectric ring, a phase shift of radiofrequency energy at the circumferentially separated points matching a phase shift of current flow through the dielectric ring during resonant circumferential current flow through the dielectric ring.

2. The plasma torch of claim 1 wherein the waveguide provides a three-port E-type junction having a first channel communicating with a waveguide entrance and splitting to a second and third channel communicating with a first and second waveguide exit at the circumferentially separated points to provide at the first and second waveguide exits a relative phase shift of 180° in the exiting radiofrequency energy, and wherein the circumferentially separated points are diametrically opposed about the dielectric ring with respect to the axis.

3. The plasma torch of claim 2 wherein the second and third channels curve inwardly about the axis.

4. The plasma torch of claim 2 wherein the first channel includes a set of stepped constrictions providing an impedance matching between the radiofrequency energy source and the dielectric ring.

5. The plasma torch of claim 1 wherein the waveguide supports a transverse electromagnetic radio field having perpendicular E and H directions, and the waveguide is releasably separable across the H direction.

6. The plasma torch of claim 1 further including a tuned cavity defining a substantially cylindrical volume holding the dielectric ring and providing opposed openings at opposed bases of the cylindrical volume along the axis and aligned with the central opening and providing the circumferentially separated points around a circumference of the cylindrical volume.

7. The plasma torch of claim 6 further including a set of washer-shaped conductive shims releasably insertable into the tuned cavity to tune the tuned cavity to a resonant frequency of the dielectric ring.

8. The plasma torch of claim 1 wherein the dielectric ring comprises multiple dielectric ring elements aligned and spaced along the axis.

9. The plasma torch of claim 1 wherein the waveguide supports a transverse electric radio field having perpendicular E and H directions, and the E-direction is perpendicular to the axis.

10. The plasma torch of claim 1 wherein a material of the dielectric ring is selected from the group consisting of alumina ($Al_2O_3$) and calcium titanate ($CaTiO_3$).

11. A plasma torch comprising:

a radiofrequency energy source;

a tuned cavity having a resonant radio frequency;

a dielectric ring providing a central opening extending along an axis;

a first gas port for introducing plasma feeder gas along the axis through a first conduit through the central opening;

a second gas port for introducing inner cooling gas into the first conduit at an angle to the axis to promote a spiral flow of inner cooling gas around the plasma feeder gas along the axis; and a third gas port for introducing outer cooling gas into a second conduit coaxially around the first conduit for flow along the axis in a sheath around the first conduit.

12. The plasma torch of claim 11 further including a manifold providing a circumferential passageway around the first conduit having a circumference cross-sectional area at least twice an axial cross-sectional area between the first and second conduits.

13. The plasma torch of claim 11 wherein the outer cooling gas exits the second conduit before an end of the first conduit through openings directing the outer cooling gas radially with respect to the axis.

14. The plasma torch of claim 13 wherein the openings direct the outer cooling gas away from the axis.

15. The plasma torch of claim 11 wherein the first conduit is a glass or ceramic tube.

16. The plasma torch of claim 11 further including a tuned cavity defining a substantially cylindrical volume holding the dielectric ring and providing opposed openings at opposed bases of the cylindrical volume along the axis and aligned with the central opening; and wherein the first and second conduits pass through and extend beyond the bases of the cylindrical volume.

17. The plasma torch of claim 16 wherein the first conduit is supported at first and second ends extending beyond the bases of the cylindrical volume by conductive metal sleeves surrounding the outer cooling flow, centering the first conduit within the central opening and opposed openings and extending axially from the bases by at least 1 cm.

18. The plasma torch of claim 17 wherein the conductive metal sleeves provide an inner wall of the second conduit.

19. The plasma torch of claim 11 wherein the dielectric ring is spaced radially from the first conduit by less than 2 mm.

20. The plasma torch of claim 11 wherein the dielectric ring comprises multiple dielectric ring elements aligned and spaced along the axis by an insulating support providing a smooth central lumen forming an inner wall of the second conduit.

21. The plasma torch of claim 20 wherein the insulating support is a polymer material.

22. A plasma torch comprising:

a radiofrequency energy source;

a dielectric ring providing a central opening extending along an axis;

a tuned cavity surrounding the dielectric ring having a resonant radio frequency matching a circumferential resonant frequency of the dielectric ring, the tuned cavity having opposed bases along the axis;

a first gas port for introducing plasma feeder gas along the axis through an entrance in a first base of the tuned cavity to pass through the central opening and out an exit in a second base of the tuned cavity; and at least one electrically conductive choke sleeve covering at least one of an entrance and exit in the tuned cavity and extending at least one centimeter from the tuned cavity along the axis or at least 4 times the inverse of the attenuation constant of the waveguide below cutoff formed by the inner surface of the sleeve.

23. The plasma torch of claim 22 further including at least two electrically conductive choke sleeves, one covering the entrance and one covering the exit in the tuned cavity and each extending at least one centimeter away from the tuned cavity along the axis.

24. The plasma torch of claim 23 wherein a first choke sleeve and a second choke sleeve support opposite ends of a first conduit containing the plasma feed gas along the axis within and through the tuned cavity.

25. The plasma torch of claim 24 wherein the first conduit is a glass tube.

26. The plasma torch of claim 24 wherein the first choke sleeve and the second choke sleeve provide a second conduit surrounding the first conduit for conducting airflow through the second conduit along the axis.

27. The plasma torch of claim 24 wherein the second choke sleeve provides an air inlet communicating with a circumferential passageway around the first conduit having a circumferential cross-sectional area at least twice a cross-sectional area between the first and second conduits.

28. The plasma torch of claim 26 further including:

a second gas port for introducing inner cooling gas into the first conduit at an angle to the axis to promote a spiral flow of inner cooling gas around the plasma feeder gas along the axis; and a third gas port for introducing outer cooling gas into a second conduit coaxially around the first conduit for flow along the axis in a sheath around the first conduit.

29. The plasma torch of claim 28 wherein the outer cooling gas exits the second conduit before an end of the first conduit through openings directing the outer cooling gas radially with respect to the axis.

30. The plasma torch of claim 29 wherein the openings direct the outer cooling gas away from the axis.

* * * * *